United States Patent [19]

Fabrizi

[11] Patent Number: 5,695,536
[45] Date of Patent: Dec. 9, 1997

[54] APPARATUS FOR THE POSITIONING AND THE MOVEMENT OF THE FILTERING CEILING OF SPRAY PAINT BOOTHS

[75] Inventor: Giancarlo Fabrizi, Arezzo, Italy

[73] Assignee: Nova Verta International S.p.A., Arezzo, Italy

[21] Appl. No.: 624,767

[22] Filed: Mar. 27, 1996

[30] Foreign Application Priority Data

Nov. 9, 1995 [IT] Italy ................. AR95A0032

[51] Int. Cl.[6] ............................................. B01D 46/042
[52] U.S. Cl. ........................... 55/422; 55/385.2; 55/502; 55/DIG. 46
[58] Field of Search ..................... 55/422, 502, 385.2, 55/282, DIG. 46

[56] References Cited

U.S. PATENT DOCUMENTS

| | | | |
|---|---|---|---|
| 4,309,200 | 1/1982 | Heffernan | 55/422 |
| 4,518,405 | 5/1985 | Lough et al. | 55/484 |
| 5,034,042 | 7/1991 | Allen, Jr. | 55/DIG. 46 |
| 5,256,312 | 10/1993 | Letersky | 55/502 |

Primary Examiner—Jay H. Woo
Assistant Examiner—Robert Hopkins
Attorney, Agent, or Firm—Young & Thompson

[57] ABSTRACT

A combination of two frames (2) and (4), one inside the other, for positioning a filtering ceiling. The frames have indented splines (3) and (5) on their facing surfaces, and an inflatable tube (6) is anchored on the spline of one of the frames. The tube is inflated to properly position the two frames, to hold the ceiling in place and to seal it so that all air must pass through the filtering ceiling. The tube is deflated to allow the filtering ceiling to be lowered for maintenance or replacement.

7 Claims, 2 Drawing Sheets

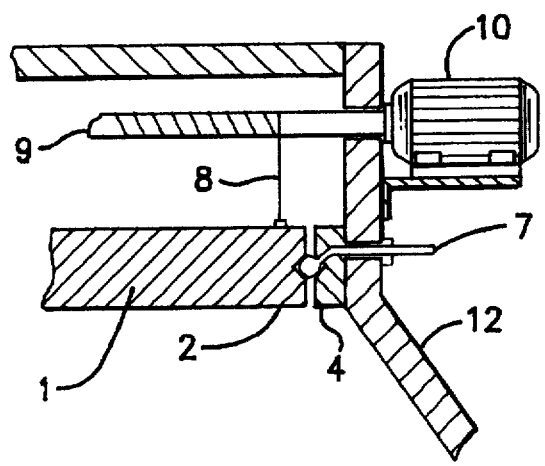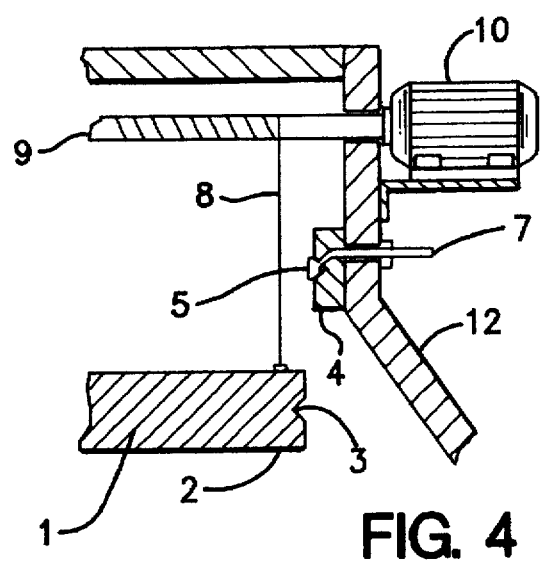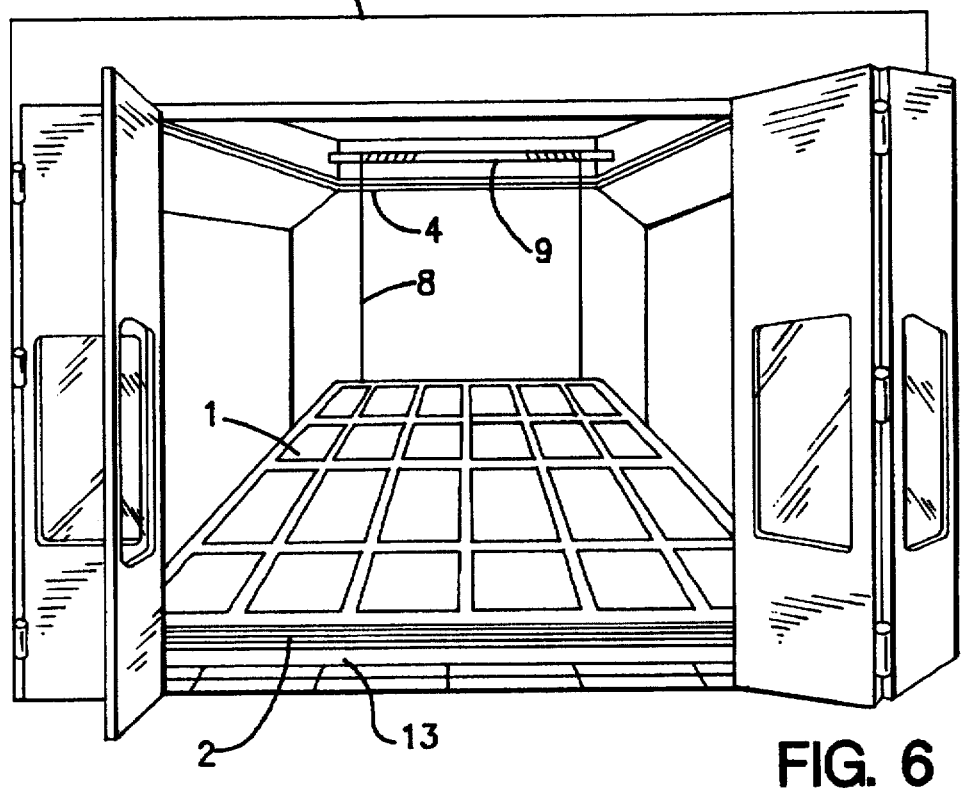

APPARATUS FOR THE POSITIONING AND THE MOVEMENT OF THE FILTERING CEILING OF SPRAY PAINT BOOTHS

BACKGROUND OF THE INVENTION

1. Field of the invention

The invention concerns an apparatus for spray paint booths in which a filtering ceiling is positioned at the top of the booth's internal chamber and is lowered to the floor when the cleaning filters in the ceiling need to be manipulated, changed or cleaned.

2. Description of the Related Art

In existing spray paint booths, when in operation, there is a flow of air which, intaken totally or partially from the outside, is conveyed into the booth with an up-to-down flow with the aim of bringing down the suspended paint and solvent particles or to dry the painted surfaces.

The air flow is filtered to remove dust and the air is distributed inside the booth by the filtering the ceiling is a panel structure that closes the upper part of the booth's internal chamber and holds a number of filtering tiles that need to be cleaned and/or changed periodically in order to revive their capacity and to limit the fall of pressure of the air flow that crosses the booth's internal chamber when the porosity of the filtering tiles is obstructed. The work required for the cleaning and/or substitution of the filtering tiles is laborious, normally consisting of removal of the supporting frame of the ceiling's reticular structure on which the same filtering tiles are fixed.

This supporting frame is positioned at the top of the booth's internal chamber and it is provided with adequate seals and screws or other blocking hooks with which the reticular structure with tiles is fixed. The removal of this unit requires the work of various people, to lower the filtering ceiling to the floor and place it on proper supports in order to have the filtering tiles removed, cleaned and eventually changed and therefore repositioned and anchored. This work of removing and cleaning is followed by the lifting of the filtering ceiling, the positioning of the peripheral seals and the anchoring of the filtering ceiling to the supporting frame, all requiring the intervention of various people.

In the known paint booths the cleaning and/or change of filtering tiles therefore requires long and laborious work and, not least, the intervention of various operators for the lowering, the lifting and finally the anchoring of the filtering ceiling.

For this reason, the operators usually carry out the operation at longer time intervals than necessary, therefore making the paint booth function in working conditions that are far from optimal, with greater energy consumption and with inadequate drying of the painted surfaces and/or inadequate cleaning of the air inside the booth.

SUMMARY OF THE INVENTION

The aim of this invention is to eliminate all the inconveniences of previous techniques and to embody an apparatus that also enables the single operator to lower the filtering ceiling in order to carry out the cleaning and/or the substitution of the filtering tiles, to reposition and stabilize the filtering ceiling in its working position, without requiring heavy work and without requiring the intervention of various people.

It is therefore an apparatus that also allows the single operator to clean or replace the filtering ceiling of his own paint booth to keep it in conditions of high efficiency, thereby saving energy and improving painting results.

The invention that reaches these results, comprises two frames in combination, one inside the other, with an indented spline on the facing surfaces, the internal frame bordering the frame supporting the filtering ceiling, the external frame to be anchored at the top of the booth's internal chamber.

It also comprises an inflatable tube anchored to the spline of one of the two frames, usually to the supporting external one, and a system for inflating and deflating the tube.

Finally the invention comprises a motor drive with lifting cables to the filtering ceiling for changing its level over the floor.

The invention allows the operator to lower and lift the filtering ceiling through the activation of the motor drive, after having deflated the inflatable tube in the spline in which it is anchored. The activation of the motor drive winds and unwinds the cables on the rotating bars by which the filtering ceiling is suspended.

Once the working position is reached, the filtering ceiling is correctly positioned by activating the fluid-mechanic system which—by inflating the flexible tube—pushes the facing frames to reach their correct position and, at the same time, seals the peripheral coupling line of the two facing frames through the inflated tube that presses on both of them.

The apparatus requires only one operator for its activation. It allows a rapid lowering-lifting movement and correct positioning of the filtering ceiling, facilitating work on the filtering tiles by a single operator therefore allowing rapid maintenance.

BRIEF DESCRIPTION OF THE DRAWINGS

The invention is described in its structure and function herebelow, with reference to the drawings, where:

FIG. 3 is the view, on different scale, of the two facing frames, of the interpositioned inflated tube and of the mechanism capable of holding and moving the filtering ceiling;

FIG. 4 reproduces the details of FIG. 3, with the inflatable tube in its contracted state and the filtering ceiling lowered in comparison with the external positioning frame;

FIG. 6 is the exemplifying perspective view of a spray paint booth with the filtering ceiling lowered to a position close to the ground.

Figure 1:
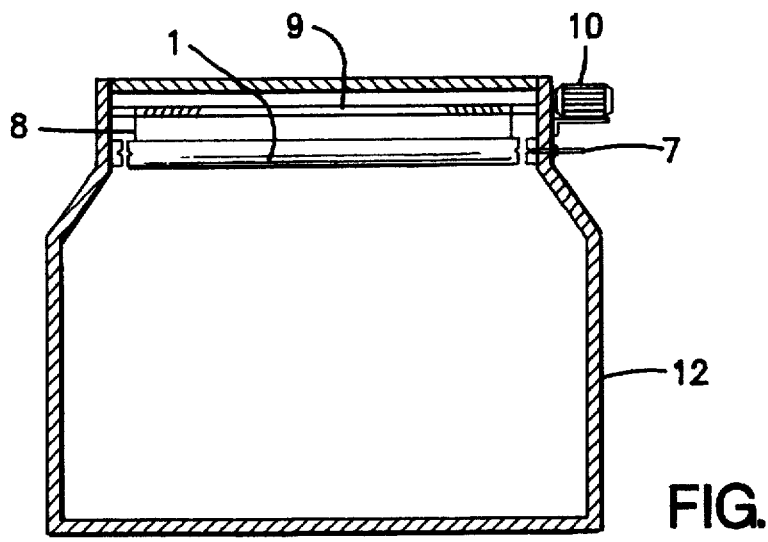
FIG. 1 represents the cross section of the paint booth viewed from the front where the filtering ceiling is in its operating position.
Figure 2:
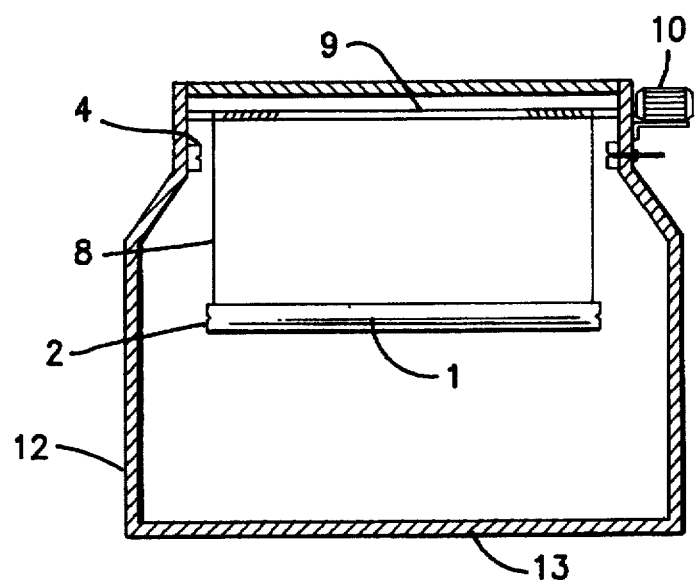
FIG. 2 represents the booth illustrated in FIG. 1, with the filtering ceiling lowered to the floor.
Figure 5:
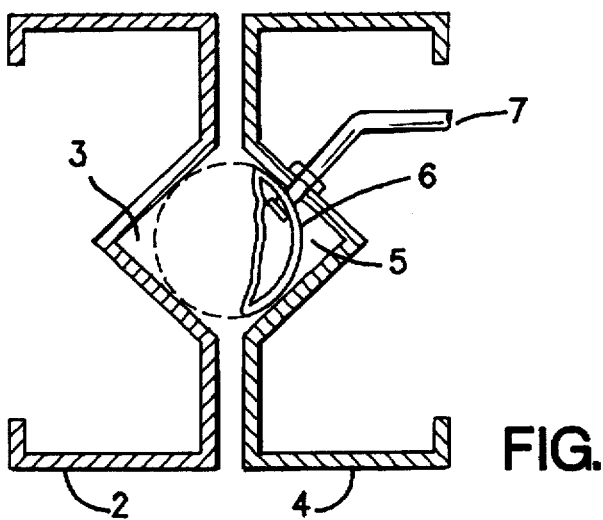
FIG. 5 is the frontal view on a different scale of their two frames in the facing state, the tube being in the contracted state, that is in the state in which the internal frame—with the filtering ceiling connected to it—can be lowered.

It must be clear, however, that the drawings and the corresponding described parts are uniquely given as an illustration of the object of this invention, and are by no means intended to restrict it.

DETAILED DESCRIPTION OF THE PREFERRED EMBODIMENTS

In the drawings, 1 indicates the filtering ceiling, 2 indicates the frame that delimits it along its edge, 3 indicates the indented spline in frame 2, 4 indicates the positioning external frame, 5 indicates the indented spline in the external frame 4, 6 indicates the inflatable tube anchored in the spline 5, 7 indicates the tube that connects the tubular to the external fluid-mechanic system, 8 indicates the supporting cables of the filtering ceiling, 9 indicates the supporting transversal rotating bars, 10 indicates the motor drive that makes the bars rotate, 12 indicates the paint booth, and 13 indicates its internal flooring.

The invention reveals itself to be an apparatus in which the following parts are combined: two frames 2 and 4, capable of being coupled one inside the other; an inflatable tube 6 with a system capable of inflating and deflating the tube so as to contract it inside the external frame to which it is anchored; the motor drive 10 through which the movement of the bars 9 and therefore of the cables 8 is commanded from; cables 8 by which the filtering ceiling 1 is suspended, so that the ceiling 1 can be moved from its working position in which the filtering ceiling 1 is coupled with the external frame 4, to a position close to the floor 13 where the operator can intervene at ground level to remove, clean or change the tiles or the filtering elements positioned on the supporting structure of the filtering ceiling 1.

The internal frame 2 encloses the frame of the filtering ceiling 1, and on the frame's peripheral surface there is the indented spline 3 normally shaped as a "V".

The external frame 4 is anchored at the top of the booth's internal chamber 12 and its surface facing the center of the booth is provided with the indented spline 5, also normally shaped as a "V".

The external frame 4 is therefore fixed and usually coupled with the flexible inflatable tube 6 which is anchored to it inside its spline 5.

The flexible tube 6, according to a different solution, could also be anchored to frame 2 that delimits the filtering ceiling 1. Its function is to determine the proper coupling between the internal frame 2 and the external frame 4, and to seal off the matching facing surfaces, to prevent the passage of air from the top of the booth to the working chamber below without going through the air filters designed to stop the solid particles suspended in the air. In both solutions, the spline to which the inflatable tube 6 is anchored and the tube itself are sized so that the tube fits within the spline to which it is fixed when the tube is deflated. The tube shall on the other hand protrude from the spline that houses it to exercise a pressure on the surfaces delimiting the spline on the other frame when it is in the inflated state, in order to prevent the passage of air between the two facing frames.

The filtering ceiling 1 is connected to a motor drive, provided with at least two rotating transversal bars 9 to which the supporting cables 8 are anchored. The free ends of the cables are anchored to the supporting structure of the same filtering ceiling 1.

This motor drive is provided by a rotation inverter with which the reversal of the rotation of the transversal bars 9 is effected to wind and unwind of the cables 8 supporting the filtering ceiling 1, from the bars.

In another possible solution, frames 2 and 4, rather than running all around the internal edge of the booth 12 and of the filtering ceiling 1, would cover only some sections where the filtering ceiling 1 and the booth's internal edge couple. In the other sections the facing parts couple tightly through a spline or press one on top of the other and here they will be equipped with proper seals.

Also with this solution it is possible to remove and to anchor the filtering ceiling 1 from the side where it mates at the top of the booth's internal chamber, through the use of the fluid-mechanic unit and to the motor drive to move the same filtering ceiling down to the floor.

What is claimed is:

1. An apparatus for positioning a filtering ceiling in a chamber comprising:

two frames sized so that one can be placed inside the other, each with an indented spline in a surface facing the other, the smaller of said two frames bordering a support for the filtering ceiling, the larger of said two frames being adapted to be anchored to the chamber;

a flexible tube anchored to the spline of one of said two frames;

a system for inflating and deflating said tube to thereby sealably hold said two frames together; and a drive operably connected to rotating bars for acting on cables by which the filtering ceiling is suspended to thereby vary its level.

2. The apparatus as claimed in claim 1, wherein said spline in the smaller frame is V-shaped and in its external surface.

3. The apparatus as claimed in claim 1, wherein said spline in the larger frame is V-shaped and in its internal surface.

4. The apparatus as claimed in claim 1, wherein the tube is anchored to the larger frame's spline.

5. The apparatus as claimed in claim 1, wherein the splines and the inflatable tube are sized so that the tube fits completely inside the spline to which it is anchored when deflated and it protrudes from the same spline to exercise a pressure on the surfaces delimitating the other spline when the tube is inflated.

6. The apparatus as claimed in claim 1, comprising at least two said bars and wherein said cables are anchored to said bars and to a supporting structure of the filtering ceiling.

7. The apparatus as claimed in claim 1, wherein said motor drive comprises a rotation inverter by which a reversal of rotation of said bars is effected thereby permitting the winding and unwinding of said cables.

* * * * *